United States Patent
Narayanasamy et al.

(10) Patent No.: US 10,797,969 B1
(45) Date of Patent: Oct. 6, 2020

(54) TRIGGERED APPLICATION EXECUTION IN SENSOR NODES

(71) Applicant: Vector Launch Inc., Tucson, AZ (US)

(72) Inventors: Senthilkumar Narayanasamy, San Jose, CA (US); Robert Randall Cleave, Half Moon Bay, CA (US); John Edward Metzger, Campbell, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/415,165

(22) Filed: May 17, 2019

(51) Int. Cl.
*H04L 29/08* (2006.01)
*H04L 12/26* (2006.01)

(52) U.S. Cl.
CPC .................. *H04L 43/02* (2013.01)

(58) Field of Classification Search
CPC ........................................ H04L 67/18
See application file for complete search history.

(56) References Cited

U.S. PATENT DOCUMENTS

| | | | |
|---|---|---|---|
| 9,641,238 B1 | 5/2017 | Coleman et al. | |
| 9,916,270 B2 | 3/2018 | Richardson | |
| 9,929,796 B2 | 3/2018 | Renouard et al. | |
| 10,084,534 B2 | 9/2018 | Coleman et al. | |
| 2014/0092726 A1 | 4/2014 | Khan et al. | |
| 2015/0024677 A1 | 1/2015 | Gopal et al. | |
| 2015/0331930 A1* | 11/2015 | Xing | G06F 16/54 707/723 |
| 2016/0357525 A1 | 12/2016 | Wee et al. | |
| 2018/0013486 A1 | 1/2018 | Irani | |
| 2018/0302290 A1 | 10/2018 | Rahman et al. | |

OTHER PUBLICATIONS

International Application No. PCT/US2018/066359, International Search Report & Written Opinion, 10 pages, dated Mar. 15, 2019.

* cited by examiner

*Primary Examiner* — Adnan M Mirza

(57) ABSTRACT

Systems, methods, and software described herein manage the initiation of applications in a system of physical nodes. In one example, a control system may identify a triggering event to initiate an application in the system based on sensor data obtained from at least a subset of the physical nodes. In response to the triggering event, the control system may identify a physical node with an image to support the execution of the application, initiate execution of the application associated with the image, and allocate or provide state information to the executing application.

18 Claims, 7 Drawing Sheets

TRIGGERED APPLICATION EXECUTION IN SENSOR NODES

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station. Although satellites and aircraft can both be configured to perform specialized operations, this equipment is typically custom-made to the particular tasks and is expensive to create and deploy, especially for organizations that may not be able to justify the use of an entire custom satellite or aircraft. As a result, organizations may avoid the use of this technology, limiting its use.

Overview

The technology described herein manages the deployment of applications in a physical node platform. In one implementation, a method of deploying an application includes identifying a triggering event to initiate the application in a system of a plurality of physical nodes. The method further includes identifying a physical node in the plurality of physical nodes with an application image to support the execution of the application and identifying state information associated with the triggering event. Once identified, the method executes the application associated with the image and allocates permissions to the application to access the state information.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
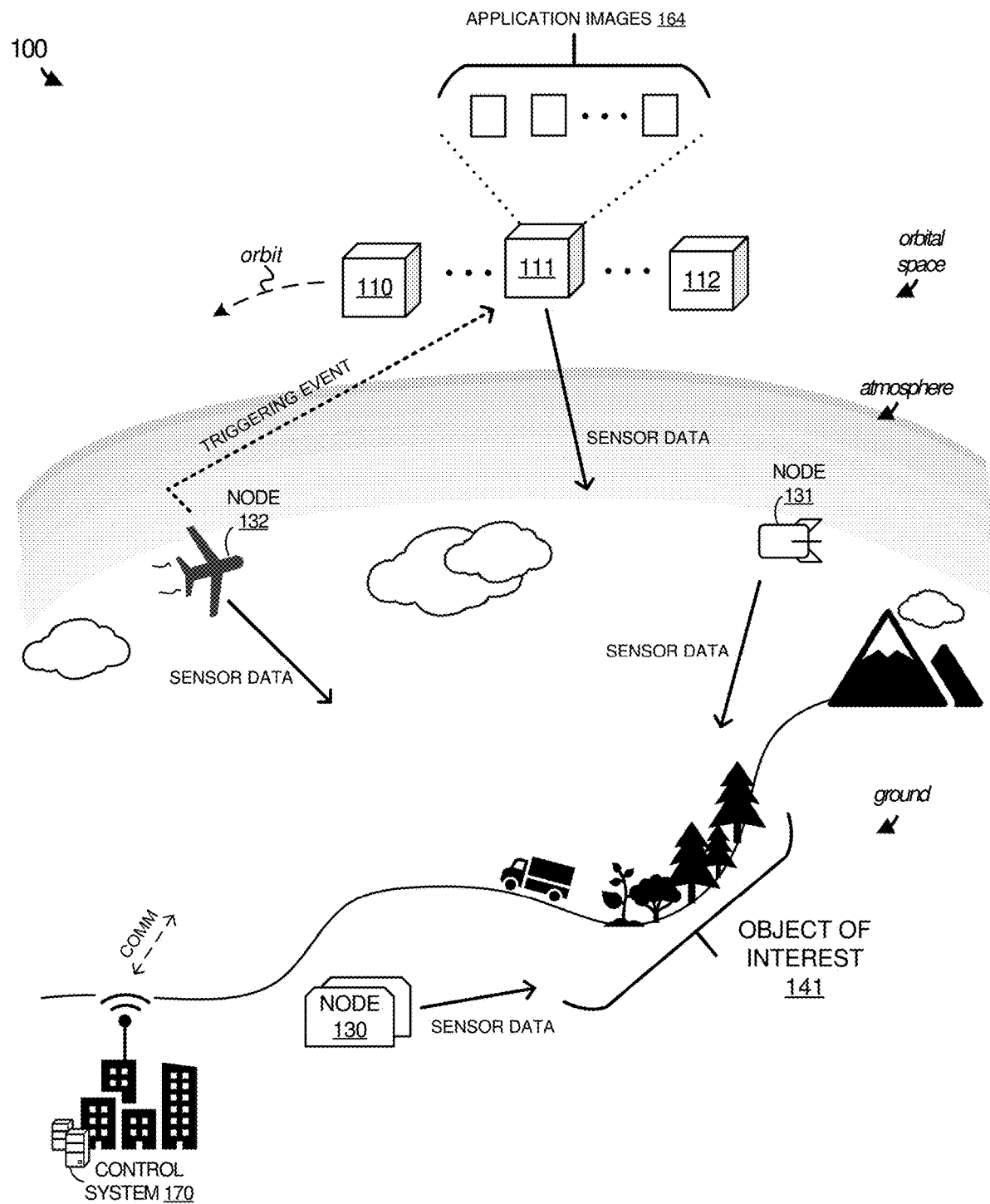
FIG. 1 illustrates a system to deploy applications in physical nodes according to an implementation.

FIG. 1 illustrates a system 100 to deploy applications in physical nodes according to an implementation. System 100 includes physical nodes 110-112 and 130-132, control system 170, and object of interest 141. Physical nodes 110-112 are representative of spaceborne nodes that may comprise satellites, shuttles, capsules, or other similar spaceborne entities. Physical nodes 131-132 are representative of atmospheric nodes, such as aircraft, airplanes, drones, balloons, or some other similar airborne objects capable of data processing and/or gathering sensor observation data. Physical nodes 131-132 may be mobile or tethered. For example, a balloon device might be mobile, tethered, or both. Physical node 130 is representative of a surface-based data observation node. In some examples, physical node 130 may be mobile and comprise a car, truck, ship, vessel, vehicle, train, or other surface or subsurface-going vessel. In other examples, physical node 130 may be stationary and comprise a building, antenna array, tower, or other structure. Any number of satellite nodes, atmospheric nodes, and surface nodes may be employed. Object of interest 141 may comprise a geographic region of interest, a physical object of interest, or some other region capable of observation by physical nodes 110-112 and 130-132 of system 100. Physical node 112 includes application images 164 that are representative of applications available for execution on physical node 112. Application mages 164 may represent container images, virtual machine images, or some other images. In some examples, the images may comprise files that are snapshots of containers or virtual machines.

In operation, physical nodes 110-112 and 130-132 are deployed in system 100 to provide a platform for the execution of applications from multiple tenants, wherein the tenants may comprise organizations, divisions of organizations, government agencies, or some other tenant. The operations of the applications may include military, commercial, government, and civilian observation or monitoring operations, communications operations, navigation operations, weather operations, and research operations. In providing the required operations, physical nodes 110-112 and 130-132 may be equipped with sensors, wherein the sensors may comprise motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other sensors.

To deploy or initiate the execution of applications in system 100, control system 170 is provided that can be used provide the application images to various nodes in system 100 and determine when and how to initiate execution of the applications. In some implementations, the application images may be specific to an individual tenant, however, it should be understood that multiple tenants may share an application image but use individual state information to provide the desired operations of the individual tenant. To trigger the execution of the applications in system 100, control system 170 or a physical node in system 100 may monitor sensor data gathered from sensors of the physical nodes and determine when trigger the execution of an application. In some implementations, metadata may be generated that is associated with the data, wherein the metadata may define geographic regions or locations associated with the sensor data, objects of interest identified in the sensor data, a type or format associate with the sensor data, a timestamp, or some other similar metadata associated with the gathered sensor metadata. The metadata may be generated at the physical node gathering the sensor data or may be generated by some other element in system 100 to be associated with the sensor data. The metadata and the corresponding may be stored in a single location, such as with control system 170, or may be distributed across one or more locations in system 100.

After a triggering event is identified for an application, control system 170 or the element that identified the triggering event may identify a physical node capable of executing the required application. In identifying the physical node, a physical node may be identified with access to or storage of the required application image, a physical node that is located in a geographic region or location associated with the triggering event, a timestamp associated with the sensor data, or some other factor. Once identified, the application may be initiated using the required application image and state information may be provided to the application to perform the required functionality. The state information may comprise sensor data required by the application, any processes specific to the application instance, information about objects of interest or tasks to be performed, or some other state information related to the triggering of the application.

Figure 2:
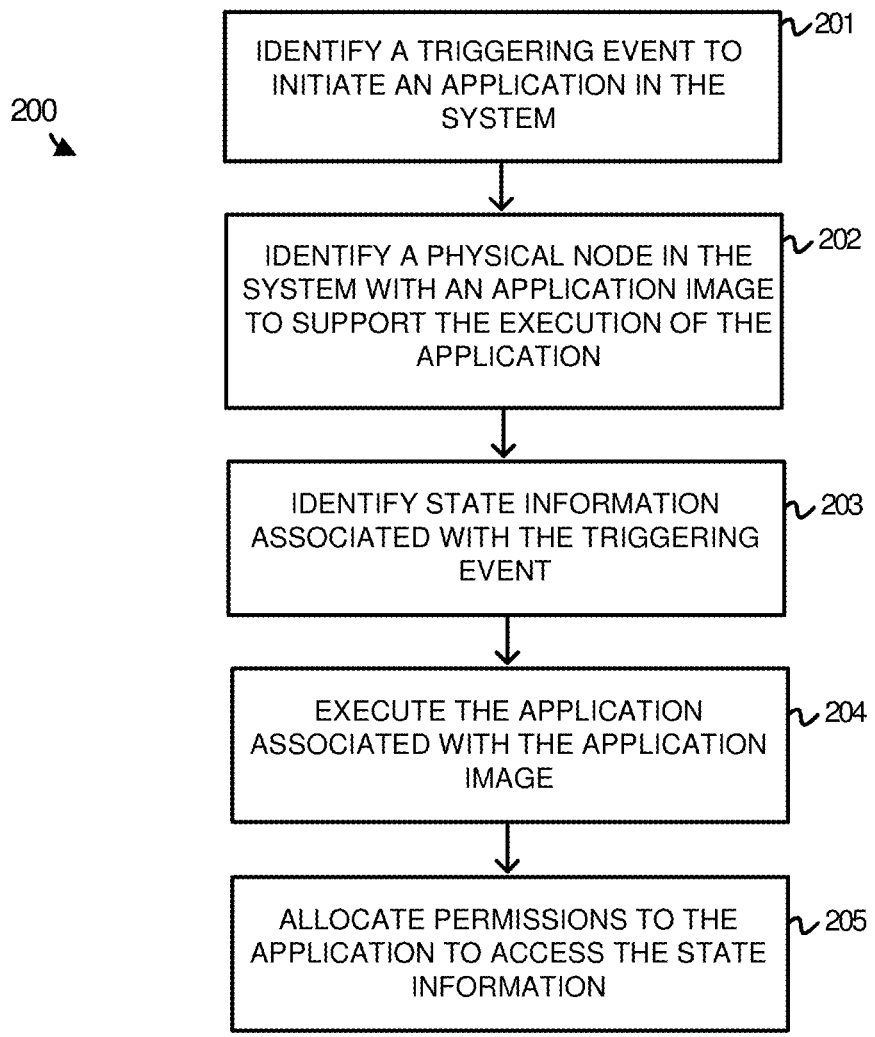
FIG. 2 illustrates an operation of deploying an application in a physical node according to an implementation.

FIG. 2 illustrates an operation 200 of deploying an application in a physical node according to an implementation. The processes of operation 200 are referenced parenthetically in the paragraphs that follow. Operation 200 may be performed by control system 170 or may be performed by a physical node of physical nodes 110-112 and 130-132.

As depicted, operation 200 identifies (201) a triggering event to initiate an application in system 100. In some implementations, the triggering event may be determined based on metadata associated with sensor data identified from sensors for physical nodes 110-112 and 130-132. The metadata may be stored with the sensor data as part of a unified storage system that can be deployed across any number of physical nodes 110-112 and 130-132 or control system 170. In some implementations, one or more applications may monitor the metadata as it is generated or identified for the sensors in system 100. When the metadata satisfies criteria, operation 200 may identify an application associated with the criteria. In other implementations, an application may process the sensor data from one or more sensors and determine when a second application should be deployed. This processing may comprise image processing, object detection, sensor values in relation to one or more criteria, or some other process to trigger the execution of another application.

Once a triggering event is identified, operation 200 further identifies (202) a physical node in system 100 with an application image to support the execution of the application. As depicted in system 100, physical nodes, such as physical node 111, may maintain storage of application images 164. The application images may be unique to each of the tenants of system 100 or may be shared across multiple tenants in some examples. For instance, an application image may be used to track the movement of an object of interest using one or more imaging sensors in system 100 and may be used by any number of tenants in system 100. In some examples, application images may be located or stored on multiple physical nodes within system 100. These images may be available on multiple physical nodes to compensate for the movement of the physical nodes, the varying locations of objects of interest, the type of sensor required for the instance of the application, or for some other purpose.

In some implementations, control system 170 and/or physical nodes 110-112 and 130-132 may maintain at least one data structure that identifies application images to be triggered based on different events. For example, control system 170 may monitor a data store for sensor data in system 100 and may determine when metadata associated with the sensor data satisfies criteria to initiate the execution of an application. Once metadata meets the criteria, control system 170 may consult the at least one data structure to select an application associated with criteria and select a physical node for the image. The physical node may be selected based on physical resources required for the application instance, the location requirements for the physical node (processing resources, sensor resources, etc.) that support the application, or some other factor. Thus, if a triggering event corresponded to object of interest 141, a physical node may be selected in system 100 that can access sensors capable of monitoring object of interest 141.

In addition to selecting the physical node with the application image, operation 200 further identifies (203) state information associated with the triggering event, executes (204) the application associated with the application image, and provides or allocates (205) permissions to the application to access the state information. Referring to an example from system 100, an application executing on physical node 132 may identify a triggering event to trigger another application in system 100. In response to identifying the triggering event, physical node 132 or another element in system 100 may identify a physical node with an available application image to support the triggering event. Once identified, a notification may be communicated to the corresponding physical node 111 to initiate an application associated with the corresponding image. Further, the notification may allocate permissions, such as addressing, security credentials, or other permissions information to access state information associated with the instance of the application. In some examples, the permissions may permit the state information to be stored in a storage location associated with the application.

In some implementations, the state information may comprise processed and unprocessed sensor data, identifiers for objects of interest in the sensor data, states of other related applications, or some other data available for use with the initiated application. In some examples, the state information may comprise additional processes that are unique to the triggering event or the tenant that is initiating the application. As an example, when a triggering event is identified by physical node 132, an application may be identified that is associated with the triggering event, such as an application from application images 164. Once identified, the application associated with the appropriate image may be initiated to support the request and provided with state information specific to the triggering event. When the application image is shared with multiple tenants of the environment, processes specific to the individual tenant may be provided or assigned to the application that permit the application to perform the operation specific to the tenant. For example, if an application were capable of gathering imaging data corresponding to an object of interest, the added processes may be used to provide image optimization, image processing, or some other operation related to the image.

In other instances, rather than attaching the processes specific to a tenant, the triggering event may identify multiple applications that are associated with the event, wherein at least one of the applications may already be executing for the associated triggering event. Returning to the example of a triggering event requiring additional imaging data for object of interest 141. A first application may be running in satellite 111 that can be used to gather the required imaging data and provide image optimization for the data. This application may be associated with a single tenant or may be associated with multiple tenants, wherein each of the tenants may access the processed sensor data from the application. In some implementations, a tenant may desire security and privacy in the sensor data that is generated from an application. In other implementations, it may be desirable for a tenant to share cost with one or more other tenants that require the processed data from the first application. In addition to the first application, a second application may be initiated that performs other operations on sensor data from the first application. These operations may include processing the imaging data to identify objects of interest, determining the movement of objects in a geographic region, or providing some other operation. Thus, when triggering the execution of an application, configurations may be required to permit each of the applications to obtain the required data for the application. These configuration operations may include providing access to the unified storage space associated with the required data, providing communication parameters for the dependent applications (e.g., addressing, credentials, etc.), or providing some other configuration operation.

In some implementations, when applications are associated with a tenant, the tenant may define the criteria that is used to initiate the applications or cause the triggering event. This criteria may define resource requirements on the physical nodes of the application, location requirements of the physical nodes for the application, or some other requirement for the application. Additionally, the tenant may permit multiple applications to be initiated based on a single triggering event. These applications can be dependent on data from the other applications to provide the desired operation. For example, while a first application may be used to convert imaging data from a first format to a second format, a second application may perform operations on the data to identify movement of objects in the imaging data, a velocity of objects in the imaging data, or some other information. As a result, permissions may be provided to the second application that may permit the second application to communicate with the first application or a storage space that corresponds to the converted format for the imaging data.

In some examples, in addition to or in place of initiating an application in the system, a triggering event may be used to stop the execution of an application. In particular, based on the sensor data (and corresponding metadata), one or more applications may be stopped in the system as a result of the sensor data meeting criteria. For example, a tenant of system 100 may define first criteria for executing a first application in system 100 and may further define second criteria for executing a second application that stops execution of the first application. Advantageously, this may permit the second application to replace or take over operations from the first application, or provide enhanced operations in relation to the first application.

In some examples, in initiating the execution of an application in the system, a first application that is operating on a physical node or control system 170 may monitor a first type of sensor data and determine when the first type of sensor data meets triggering criteria. Once met, the first application may identify an image corresponding to the required second application and initiate an instance of the second application. The second application may monitor the same type of sensor data as the first application or may monitor a different type or types of sensor data. For example, a first application may monitor radio frequency (RF) data and determine when the RF data meets criteria. When the RF data meets the criteria, the first application may trigger a second application that monitors imaging data for the same object of interest corresponding to the RF data. Additionally, the second application may further trigger one or more additional applications based on the imaging data satisfying second criteria. Advantageously, tenants of the system may generate a string of applications that can each perform various tasks and combine the tasks to provide a desired overall operation of the tenant. The tasks may include optimizing sensor data, identifying triggering events for other applications, processing the sensor data to identify or track objects of interest, or perform some other task for the tenant.

Figure 3:
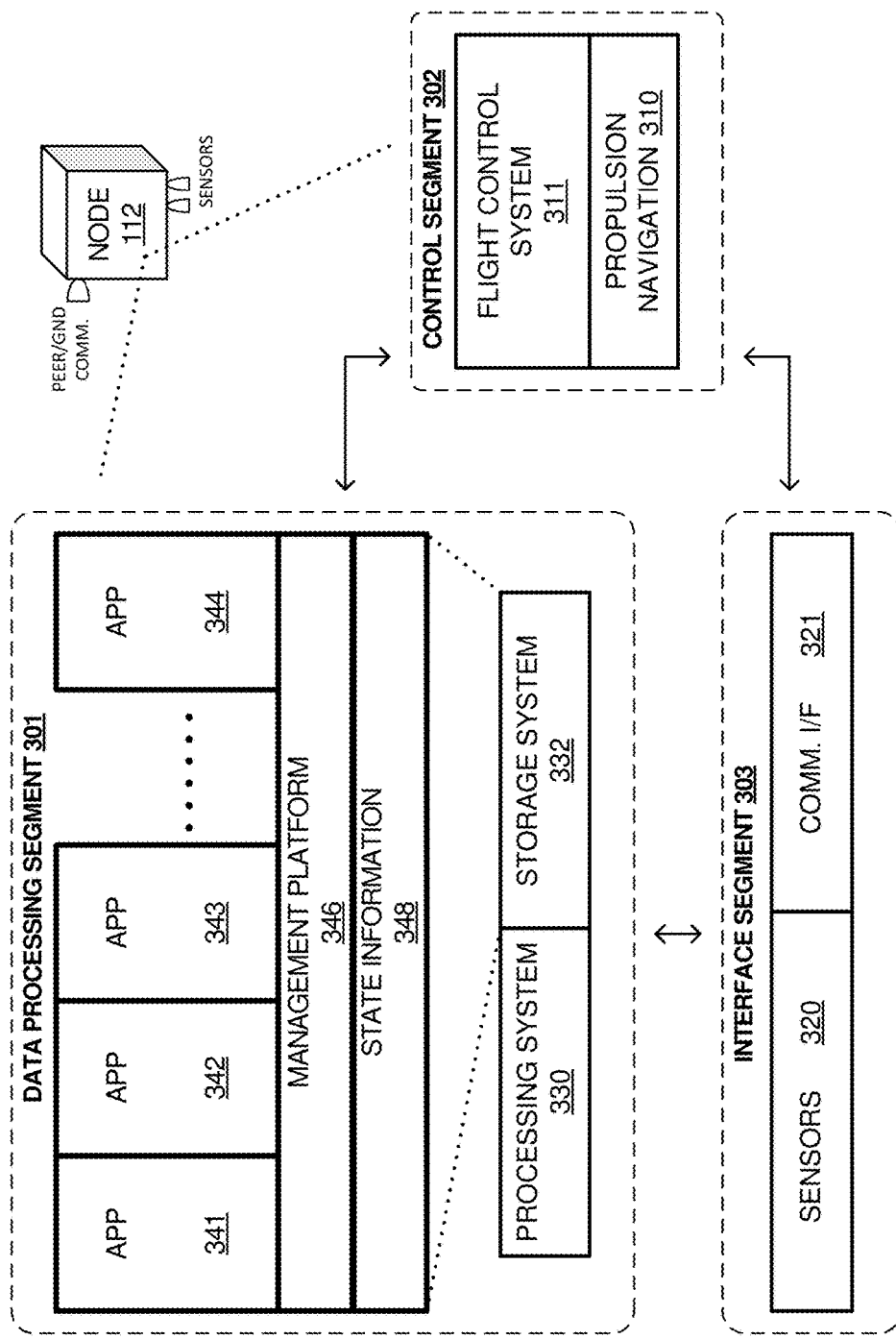
FIG. 3 illustrates an expanded view of a physical node according to an implementation.

FIG. 3 illustrates an expanded view 300 of physical node 111 of FIG. 1 according to an implementation. Physical node 111 can be an example of any of nodes 110-112 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes in a system may provide a platform for tenants to deploy and execute applications that provide various operations. These operations may include military and civilian observation operations, communications operations, navigation operations, weather operations, and research operations. As depicted in expanded view 300, data processing system 301 includes processing system 330 and storage system 332, where storage system 332 stores management platform 346 (operating system, hypervisor, or the like), applications 341-344, and state information 348. Applications 341-344 execute on top of management platform 346 and may operate inside of one or more logical nodes, where the logical nodes may comprise containers, virtual machines, or some other similar virtualized element. Applications 341-344 may comprise non-virtual applications that execute via an operating system in some examples. Applications 341-344 may be provided processing resources, storage resources, sensor resources, and the like by management platform 346, wherein management platform 346 may provide the resources in accordance with operational requirements of the application (often identified by the tenant initiating the application). The operational requirements may comprise execution periods for the application, sensor requirements for the application, storage requirements of the application, or some other requirement defined by the application creator.

In initiating each of applications 341-344, a triggering event may be identified by a physical node or control system based on processed or unprocessed sensor data in the system. In some implementations, sensor data for system 100 may be stored across one or more physical nodes or control system 170. As the sensor data is obtained or stored, a first application or process may monitor the sensor data and determine when a second application should be initiated based on the monitored sensor data. In some implementations, sensor data, both processed and unprocessed, may be stored with metadata that indicates attributes associated with the data. These attributes may include a geographic location associated with the data, the format of the data, an identifier associated with the sensor, objects of interest in the data, time stamps, or some other attribute associated with the sensor data. When the metadata satisfies criteria associated with an application triggering event, at least one physical node may be selected to support the triggering event, and a corresponding application may be initiated on the physical node for the event.

As described herein, application images may be deployed to one or more physical nodes of the system. The application images may be unique to each of the tenants or may be shared by multiple tenants. The application images may comprise containers, virtual machines, or some other containerized or virtualized endpoint. When an application triggering event occurs, a notification may be provided to a corresponding physical node to initiate the application associated with the event. The physical node may be selected based on the physical resources of the physical node, the application images available to the physical node, the location of the physical node, or some other factor. In addition to initiating the application, the control system or physical node that triggers the execution of the application may identify state information to be made available to the application. The state information may comprise processed or unprocessed sensor data, information about objects of interest, states of other processes or applications processing the sensor data, or some other information about the sensor data. In some implementations, the state information may further comprise processes that are unique to the tenant or the triggering event. For example, application images in the system may be shared by multiple tenants and may be requested as they are required by each of the tenants. For example, a tenant may require an application image when movement of an object is detected in a region of interest. In response to detecting the movement of the object, the application associated with the application image may be initiated, wherein the application may be used to obtain and optimize imaging data related to the region of interest, and processes (state information) unique to the particular tenant may be used to provide further operations on the imaging data. These processes may interact with the application via an application programming interface (API) or other mechanisms to provide additional operations with respect to the gathered sensor data.

In some implementations, the processes of the individual tenant may be located in the same virtual space, such as the container or virtual machine. However, it should be understood that the unique tenant processes may execute in a separate virtual space and may request and receive data from sensors or other applications that can be shared with one or more other tenants.

In some examples, the state information for the initiated application may be stored on the same physical node as the executing application. In other implementations, the state information may be stored on one or more other physical nodes or ground systems as part of a distributed data store. The data store may store sensor data with metadata associated with the sensor data, may store state information for the applications, may store unique tenant processes, or may store some other data. When an application is deployed, permissions may be provided to the application that permit the application to access specific portions of the data store corresponding to the triggering event.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the sensor during defined time periods, may jointly obtain data derived from the sensor at the same time (e.g. all logical nodes can access the same imaging data), or may be provided access to sensors at some other interval. In addition to sensors 320, interface segment 303 further includes communication interface 321 that may be used to communicate with other physical nodes and/or management and control systems for system 100. In some examples, communication interface 321 may work with management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
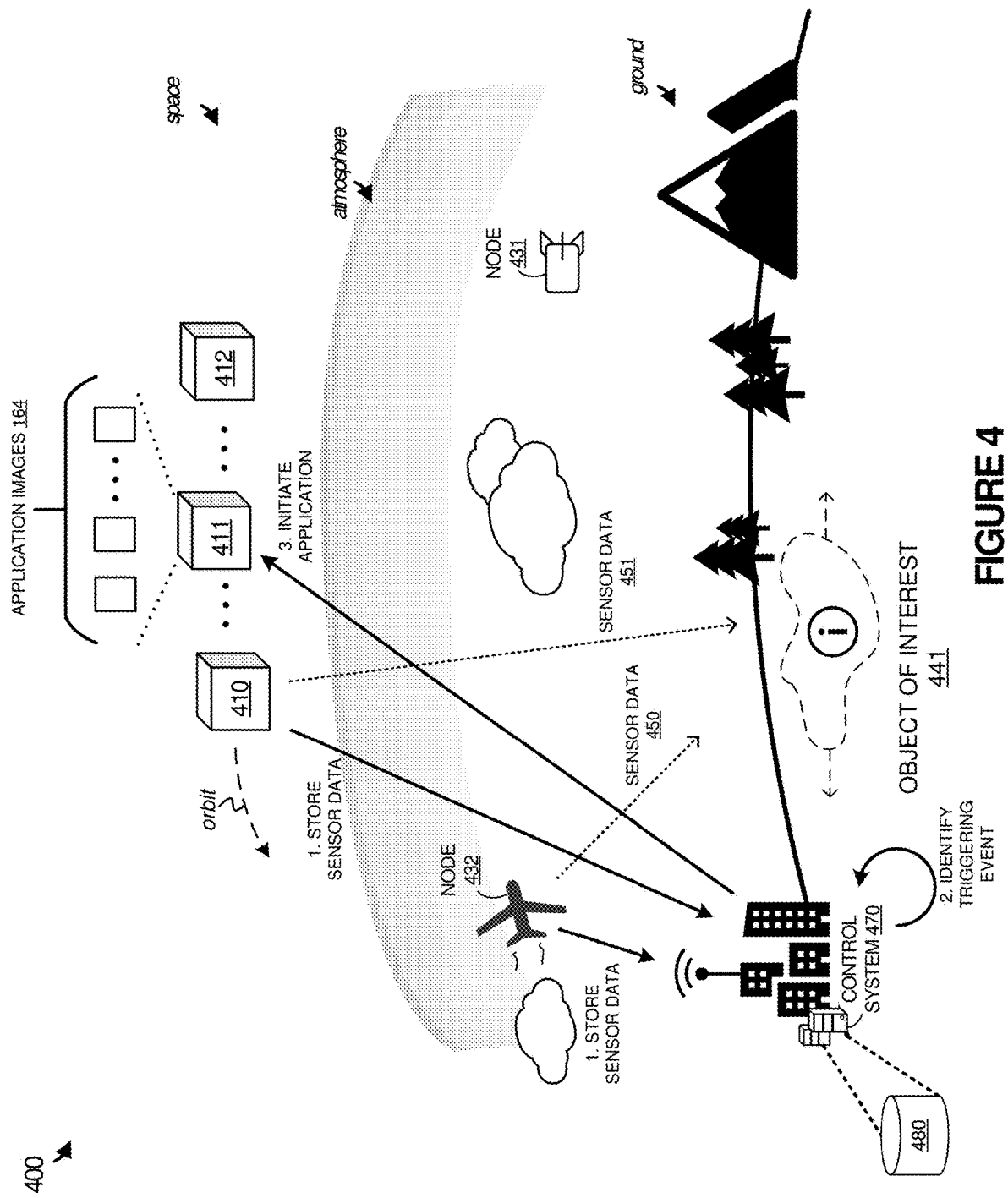
FIG. 4 illustrates an operational scenario of triggering deployment of an application according to an implementation.

FIG. 4 illustrates an operational scenario 400 of triggering deployment of an application according to an implementation. Operational scenario 400 includes physical nodes 410-412 and 430-431, control system 470, and object of interest 441. Control system 470 further maintains data store 480 that corresponds to gathered sensor data from various physical nodes in the system.

As depicted, physical nodes 410 and 432 gather, at step 1, sensor data 450-451 associated with object of interest 441, wherein the sensor data may comprise. As the sensor data is gathered, the data is stored in data store 480 that is provided by control system 470. Although demonstrated as a single data store, it should be understood that the data store may comprise a distributed data store where the sensor data may be stored across one or more physical locations. The physical locations may comprise ground systems or may comprise physical nodes in the system with storage systems capable of storing the sensor data. The data may be distributed in the system based on proximity to the physical node collecting the sensor data, may be based on any applications that require access to the sensor data, or may be based on any other factor.

As the sensor data is obtained from the sensors in the system, metadata may be stored with the sensor data that can indicate various attributes associated with the sensor data. The metadata may include the format for the sensor data, a geographic location of the sensor data, any identified objects of interest in the data, timestamps associated with the sensor data, or some other information associated with the data. In some examples, the sensor data may be determined using attributes of the corresponding physical node, such as the location information associated with the node, the sensors available on the physical node, or some other information related to the physical node. In other examples, the metadata may be generated by processing at least a portion of the sensor data to determine the attributes associated with the sensor data. This processing may include converting the format of the data, identifying objects of interest in the sensor data, optimizing the data, or some other similar processing operation with the data. Once processed, the sensor data may be stored with corresponding metadata. For example, physical node 432 may monitor object of interest 441 and may identify a vehicle type associated the object of interest, a velocity of the object of interest, or some other attributes associated with the object of interest. Once determined, the attributes may be stored as metadata with the sensor data in data store 480. In some examples, the data stored in data store 480 may be processed by another application executing in the system. As a result, data store 480 may store unprocessed or raw sensor data, as well as processed sensor data from one or more applications.

As the sensor data is stored, control system 470 may monitor the sensor data to determine, at step 2, when a triggering event occurs for an application. The triggering event may occur based metadata in data store 380 satisfying criteria for a particular application. For example, an application triggering event may occur when an object of interest is in a specific geographic location and is moving at a defined velocity. In some implementations, a tenant of the system may define the conditions or criteria that are used to trigger the use of an application associated with the tenant. As a result, a first process or application with access to data store 480 may monitor sensor data as it is obtained from the various sensors of the system and determine when an application should be triggered.

When an application triggering event is identified, control system 470 may determine an application image available to support the triggering event and a corresponding physical node with access to the application image. In some implementations, an application image may be available on multiple physical nodes of the system and control system 470 may be used to determine which of the physical nodes to deploy the required application image. The selection of the physical node may be determined based on physical resource requirements associated with the triggering event, geographic location associated with the triggering event, or some other factor. Thus, when a triggering event is identified that is associated with object of interest 441, control system 470 may determine physical nodes with sensors, processing resources, and the like that are capable of monitoring object of interest 441.

Here, the triggering event for object of interest 441, initiates, at step 3, an application from application images 164 of physical node 411. In some examples, each of the application images may be unique to a particular tenant, however, it should be understood that one or more of the application images may be shared by multiple tenants. The application images may comprise application container images, virtual machine images, or some other virtualized endpoint image. When initiated, the application instance associated with the triggering event may be allocated processing resources, storage resources, sensor resources, or other resources associated with the physical node. The resources may be allocated based on a service level agreement, wherein the tenant may define physical resource requirements for the deployed application, such as processing resources, storage resources, sensor resources, and the like.

In addition to initiating the application image in physical node 411, the application may further be allocated permissions or accessibility information to access state data. In some examples, the state information may be locally provided to the physical node and stored in locations associated with the executing application. In other examples, the state information may be stored in the common data store that can be distributed across multiple physical nodes or ground systems, such as control system 470. The state information may comprise processed and unprocessed sensor data, information associated with objects of interest, processing states of other applications, or some other data that can be provided to the application. In some examples, the permissions information may comprise addressing or access information, credentials, or some other information to access the required state information. In some implementations, in addition to, or in place of, providing the data for the application, the state information may comprise processes that can be unique to the tenant initiating the application. In particular, an application image may include base processes that can be used by multiple tenants, wherein the processes may be used to gather data from sensors, covert the data to a particular format, or provide other operations on the data. The state information may include processes that provide operations that are unique to the tenant deploying the application, wherein the operations may include object identification and movement tracking, sensor data filtering, or some other operation that is unique to the tenant deploying the application. The tenant specific processes may interact with the base processes using an API in some examples.

In some implementations, an application triggering event may initiate a first application that is reliant on one or more other applications in the system, wherein the other applications may be initiated at the same time as the first application or may be initiated prior to the first application. As a result, in initiating the first application, control system 470 may provide addressing information, credentials, and other information that permits that first application to interact with the other applications.

Figure 5:
FIG. 5 illustrates a data structure for managing sensor data according to an implementation.

FIG. 5 illustrates a data structure 500 for managing sensor data according to an implementation. Data structure 500 is representative of a data store, such as data store 480 from FIG. 4 that can be used to store the sensor data obtained from various physical nodes of a system. Data structure 500 includes metadata columns 502-504, and sensor data column 505. Metadata columns 502-504 includes metadata 510-513, 520-523, and 530-533. Sensor data column 505 includes sensor data 540-543. Although demonstrated as a table in the example of FIG. 5, it should be understood that one or more arrays, tables, linked lists, or some other data structures may be used to store the sensor data from the physical sensors in the system. In some examples, sensor data may be stored in a distributed data store across ground systems, physical nodes, or some other storage element. The data may be stored based on proximity to the sensor (e.g., in a physical node closest to the sensor), may be stored based on proximity to an associated application, or may be stored based on some other factor.

As described herein, as sensor data is gathered from sensors in the system, the sensor data may be stored in data structure 500 with associated metadata. The metadata may be generated based on attributes associated with the physical node, the physical sensor, or some other attribute, or may be generated based on processing the sensor data. The sensor data may be processed to generate a format type, may be processed to determine objects of interest associated with the sensor data, may be processed to optimize the format of the data, or may be processed to provide some other metadata. As the metadata is created, the metadata may be stored with the corresponding sensor data in data structure 500. As an example, metadata 511, 521, and 531 is generated or created for corresponding sensor data 541.

When the sensor data is stored in data structure 500, one or more processes or applications may inspect data structure 500 to determine when the metadata satisfies criteria to initiate an application in the physical node system. In some implementations, an administrator associated with an application may define the criteria associated with triggering the applications, wherein the administrator may define a function, such as a Boolean function, that indicates the requirements of initiating the application. As a result, when the required attributes are identified in the corresponding columns of metadata columns 502-504, a triggering event may be identified to initiate an application in the system.

In some implementations, the triggering event may trigger multiple applications to be executed in the system, wherein the application may correspond to the same or different tenants. In some implementations, the triggering event may be used to stop one or more applications based on the metadata associated with the sensor data. For example, a tenant may execute a first application when metadata meets first criteria, however, when the metadata satisfies a second criteria, the system may stop execution of the first application and initiate a second application that can provide different or enhanced functionality. Advantageously, this permits an application to replace or takeover the operations of another application.

Figure 6:
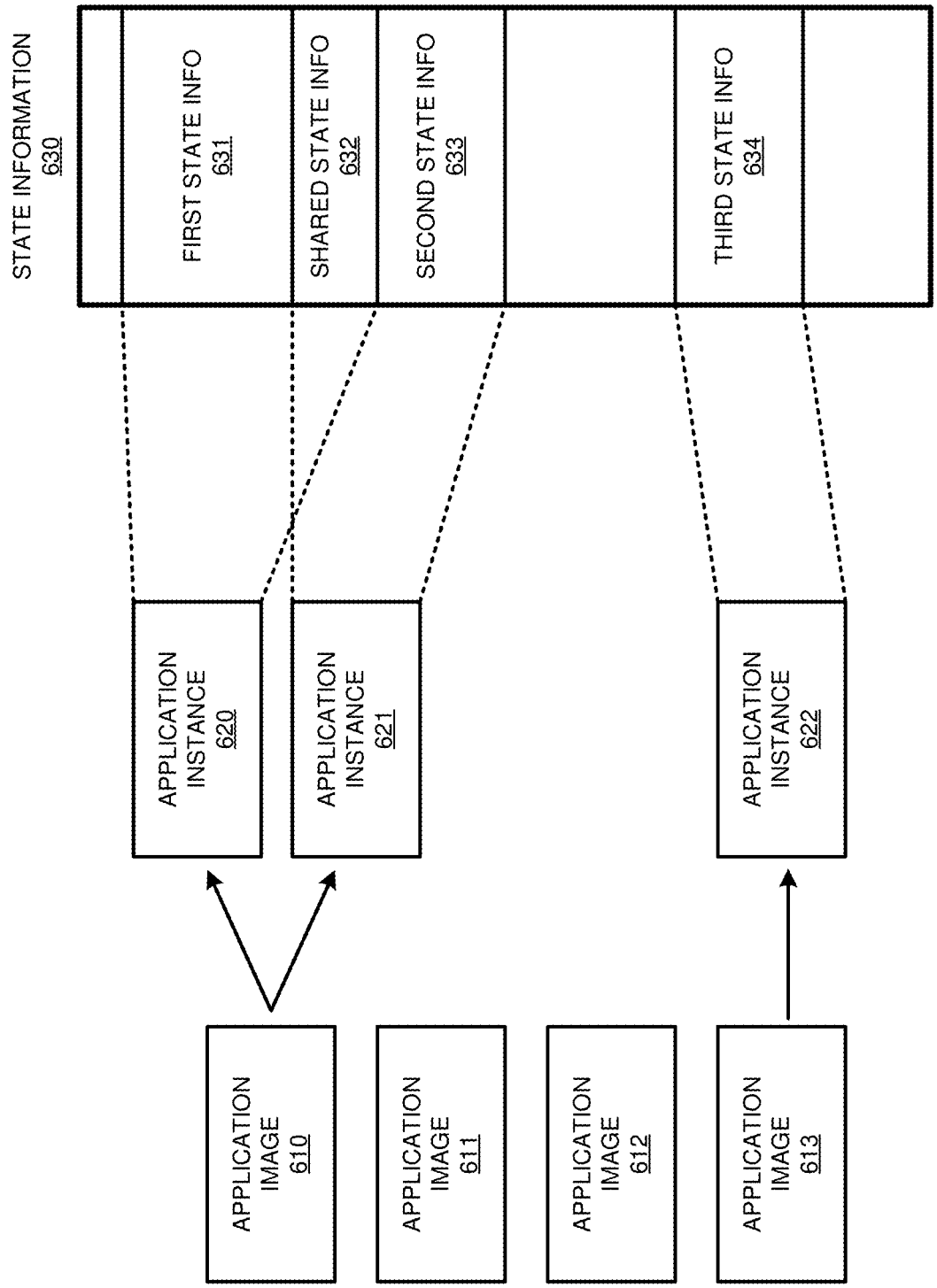
FIG. 6 illustrates an operation to execute an application for a tenant according to an implementation.

FIG. 6 illustrates an operation 600 to execute an application for a tenant according to an implementation. Operation 600 is representative of the initiation of applications in a physical node of a system. Operation 600 includes application images 610-613, application instances 620-622, and state information 630 with portions of the state information 631-634.

As described herein, when an application triggering event is identified for a tenant of a physical node system, the element (ground control system or physical node) identifying the event may determine a physical node capable of supporting the execution of the application associated with the triggering event. In selecting the physical node, the element may determine which of the physical nodes includes an application image associated with the application, which of the physical nodes includes the required physical resources associated with the triggering event, which of the physical nodes is in a physical location to support the operations of the application, or some other factor. Once a node is selected, an application instance is initiated to support the request and the corresponding state information is provided to the application instance.

Here, application instances 620-622 are initiated from application images. In some implementations, the application images may be shared by multiple tenants, however, it should be understood that the application images may be unique to a particular tenant. As an example, application instances 620-621 are initiated from application image 610, wherein each of the application instances may correspond to a different tenant with permissions to initiate an application instance from application image 610. The application instances may be initiated based on unique requirements for each of the tenants, wherein the tenants may define processed or unprocessed sensor data that can initiate or trigger the application instance. In contrast, application image 613 may be unique to a tenant of the system permitting application instance 622 to be initiated based on a triggering event associated with the tenant.

In addition to initiating the application instance, state information is also allocated to the application instance that is associated with the triggering event. In some implementations, the state information is associated with the triggering event or tenant that requires the application instance. The state information may include processed and unprocessed sensor data, status information for other applications associated with the tenant, processes that are unique to the triggering event or tenant, or some other state information. Here, application instance 620 is allocated first state information 631 and shared state information 632, application instance 621 is allocated second state information 633 and shared state information 632, and application instance 622 is allocated third state information 634. In allocating the state information to the applications, permissions may be provided to the application to access the required data. These permissions may include addressing and credentials to access the required data, or may comprise storing the state information in a storage location addressable by the application. In some examples, the state information may be stored on the same physical node as the executing applications, however, it should be understood that the state information may be stored in a distributed data store that can be stored across one or more physical nodes or ground systems.

Figure 7:
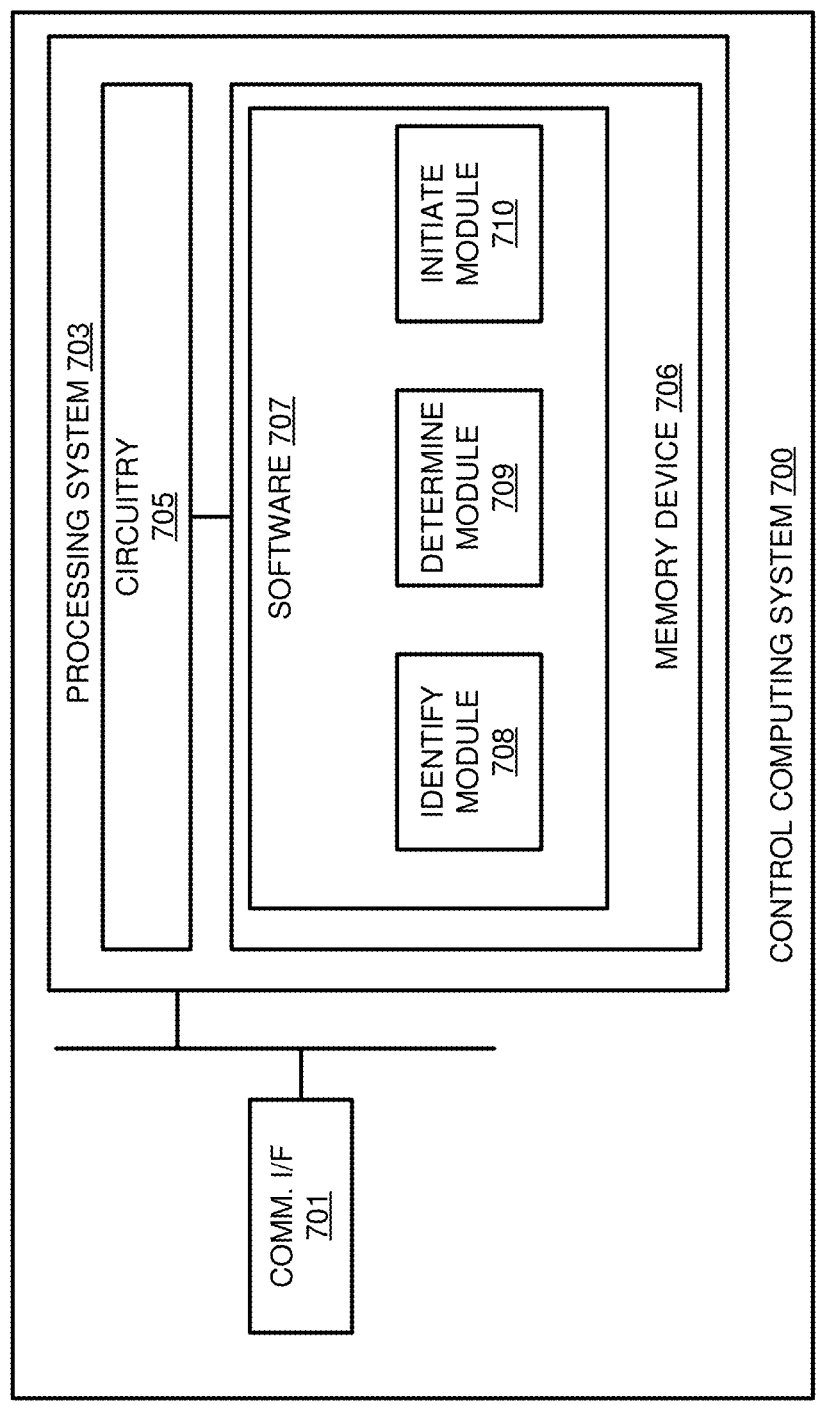
FIG. 7 illustrates a management computing system according to an implementation.

FIG. 7 illustrates a control computing system 700 according to an implementation. Computing system 700 is representative of any computing system or systems with which the various operational architectures, processes, scenarios, and sequences disclosed herein for a control system may be implemented. Computing system 700 is an example of control system 170 of FIG. 1, although other examples can be employed. In some implementations, computing system 700 may represent one or more physical nodes, a ground control system, or some other system capable managing sensor data, including combinations thereof. Computing system 700 comprises communication interface 701 and processing system 703. Processing system 703 is linked to communication interface 701. Processing system 703 includes processing circuitry 705 and memory device 706 that stores operating software 707. Computing system 700 may include other components such as a power system, battery, and enclosure that are not shown for clarity.

Communication interface 701 comprises components that communicate over communication links, such as network cards, ports, radio frequency (RF), processing circuitry and software, or some other communication devices. Communication interface 701 may be configured to communicate over conductive, wireless, or optical links. Communication interface 701 may be configured to use Time Division Multiplex (TDM), Code Division Multiplex (CDM), Internet Protocol (IP), Ethernet, optical networking, wireless protocols, communication signaling, or some other communication format, including combinations thereof. In at least one implementation, communication interface 701 may be used to communicate with one or more physical nodes in a system, where the physical nodes may comprise mobile or stationary devices, such as satellites, drones, airplanes, or balloons, land and water vehicles, stationary surface or sub-surface nodes, or some other devices.

Processing circuitry 705 comprises microprocessor, processor, Field Programmable Gate Array (FPGA), and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 705 is typically mounted on a circuit board that may also hold memory device 706 and portions of communication interface 701. Operating software 707 comprises computer programs, firmware, or some other form of machine-readable program instructions. Operating software 707 includes identify module 708, determine module 709, and initiate module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, identify module 708 directs processing system 703 to identify a triggering event to initiate an application in one or more physical nodes of a system, wherein the triggering event may be based at least in part on sensor data obtained from one or more of the physical nodes. In some examples, computing system 700 with other physical nodes may maintain a data store that associates processed and unprocessed sensor data with metadata. Identify module 708 may monitor the metadata associated with sensor data to determine when the metadata satisfies criteria corresponding to an application triggering event. The criteria may be defined by the system tenant that requires the application, wherein the tenant may select one or more attributes to be identified in the metadata to trigger the execution of the application.

After the identification of the triggering event, determine module 709 directs processing system 703 to determine a physical node in the system capable of supporting the execution of an application associated with the triggering event. In selecting the physical node, determine module 709 may identify physical nodes with access to an application image associated with the application (e.g., physical nodes that store the application image or can obtain the application image from another physical node), physical nodes that correspond to a location associated with the triggering event, physical nodes with resources capable of supporting the execution of the application, or some other factor. For example, the triggering event may be triggered when sensor data for a particular geographic region meets criteria. As a result, the physical node to support the triggering event may be selected from physical nodes that correspond to the geographic location.

Once a physical node is selected, initiate module 710 directs processing system 703 to initiate the execution of the application from the application image and provides access to state information associated with the triggering event. The state information may comprise processed or unprocessed sensor data associated with the triggering event, additional processes associated with the triggering event, or some other information. In some implementations the state information may be stored in a storage space that is available to the application, such that the application may access the required state information. This storage space may be local to the physical node executing the application or may be located on another element in the system. In other implementations, in providing access to the state information, addressing and other credentials may be allocated to the executing application permitting the application to access the required state information. Thus, rather than moving sensor data to a storage location available to the application, the application may be allocated permissions to access data from a common data store for the system.

In some implementations, the identification of the triggering event may be provided by a ground control system. In other implementations, the sensor data monitoring and event identification may occur in a physical node of the system, wherein the physical node may initiate an application on any physical node of the system.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

based at least on sensor data obtained from a set of physical nodes among a system comprising a plurality of physical nodes, identifying a triggering event to initiate execution of an application associated with a plurality of tenants of the system;

identifying a physical node in the plurality of physical nodes with an application image to support the execution of the application;

identifying state information associated with the triggering event, wherein the triggering event and the state information are associated with a first tenant among the plurality of tenants, and wherein the state information comprises unprocessed sensor data, processed sensor data, or processes associated with the first tenant;

executing the application associated with the application image on the physical node; and allocating permissions to the application to access the state information.

2. The method of claim 1, wherein identifying the triggering event to initiate execution of the application in the system of the plurality of physical nodes based on the sensor data obtained from the set of physical nodes comprises:

monitoring metadata associated with the sensor data; and determining when the metadata satisfies criteria associated with the triggering event.

3. The method of claim 2, wherein the metadata indicates at least physical locations associated with the sensor data and times associated with the capture of the metadata.

4. The method of claim 1, wherein the physical nodes comprise airborne, spaceborne, or surface nodes.

5. The method of claim 1, wherein identifying the physical node in the plurality of physical nodes with the application image to support the execution of the application comprises:

identifying physical resource requirements or location requirements associated with the triggering event; and identifying the physical node in the plurality of physical nodes with the application image to support the execution of the application based on the physical resource requirements or the location requirements.

6. The method of claim 1 further comprising:

identifying a second application associated with the triggering event;

identifying a second physical node in the plurality of physical nodes with a second application image to support the execution of the second application; and executing the second application associated with the second application image on the second physical node.

7. The method of claim 6, wherein the second application is dependent on data generated from the application.

8. The method of claim 1, wherein the application image comprises a container image or a virtual machine image.

9. A system comprising:

a plurality of physical nodes; and a control system configured to:

based at least on sensor data obtained from a set of physical nodes among the plurality of physical nodes, identify a triggering event to initiate execution of an application associated with a plurality of tenants of the system;

identify a physical node in the plurality of physical nodes with an application image to support the execution of the application;

identify state information associated with the triggering event, wherein the triggering event and the state information are associated with a first tenant among the plurality of tenants, and wherein the state information comprises unprocessed sensor data, processed sensor data, or processes associated with the first tenant;

execute the application associated with the application image; and allocate permissions to the application to access the state information.

10. The system of claim 9, wherein identifying the triggering event to initiate execution of the application in the system of the plurality of physical nodes based on the sensor data obtained from the set of physical nodes comprises:

monitoring metadata associated with the sensor data; and determining when the metadata satisfies criteria associated with the triggering event.

11. The system of claim 10, wherein the metadata indicates at least physical locations associated with the sensor data and times associated with the capture of the metadata.

12. The system of claim 9, wherein identifying the physical node in the plurality of physical nodes with the application image to support the execution of the application comprises:

identifying physical resource requirements or location requirements associated with the triggering event; and identifying the physical node in the plurality of physical nodes with the application image to support the execution of the application based on the physical resource requirements or the location requirements.

13. The system of claim 12, wherein the physical resource requirements comprise processing system requirements, storage requirements, or sensor requirements associated with the triggering event.

14. An apparatus comprising:

one or more non-transitory computer readable storage media;

a processing system operatively coupled to the one or more non-transitory computer readable storage media; and program instructions stored on the one or more non-transitory computer readable storage media that, when executed by the processing system, direct the processing system to:

based at least on sensor data obtained from at least one physical node among a system comprising a plurality of physical nodes, identify a triggering event to initiate execution of an application associated with a plurality of tenants of the system;

identify a physical node in the plurality of physical nodes with an application image to support the execution of the application;

identify state information associated with the triggering event, wherein the triggering event and the state information are associated with a first tenant in the plurality of tenants, and wherein the state information comprises unprocessed sensor data, processed sensor data, or processes associated with the first tenant;

execute the application associated with the application image; and allocate permissions to the application to access the state information.

15. The apparatus of claim 14, wherein identifying the triggering event to initiate execution of the application in the system of the plurality of physical nodes based on the sensor data obtained from the at least one physical node comprises:

monitoring metadata associated with the sensor data; and determining when the metadata satisfies criteria associated with the triggering event.

16. The apparatus of claim 14, wherein the metadata indicates at least physical locations associated with the sensor data and times associated with the capture of the metadata.

17. The apparatus of claim 14, wherein identifying the physical node in the plurality of physical nodes with the application image to support the execution of the application comprises:
   identifying physical resource requirements or location requirements associated with the triggering event; and
   identifying the physical node in the plurality of physical nodes with the application image to support the execution of the application based on the physical resource requirements or the location requirements.

18. The apparatus of claim 14, wherein the application image comprises a container image or a virtual machine image.

* * * * *